United States Patent [19]

Barr

[11] Patent Number: 5,474,686
[45] Date of Patent: Dec. 12, 1995

[54] SLUDGE TREATING PROCESS AND APPARATUS

[76] Inventor: Derek J. Barr, 2 Warwick Drive, London, United Kingdom, SW15 6LB

[21] Appl. No.: 125,812

[22] Filed: Sep. 24, 1993

[30] Foreign Application Priority Data

Sep. 28, 1992 [GB] United Kingdom ............. 9220428

[51] Int. Cl.[6] ............................................. F23G 5/04
[52] U.S. Cl. ................... 210/771; 210/770; 210/768; 210/805; 210/180; 180/224; 180/238; 180/346
[58] Field of Search ...................... 210/770, 805, 210/180, 768, 771; 110/224, 238, 346

[56] References Cited

U.S. PATENT DOCUMENTS 4,901,654  2/1990  Albertson et al. ............... 110/346
5,069,801  12/1991  Girovich ........................ 210/770
5,309,849  5/1994  Krebs .......................... 210/180

Primary Examiner—Robert A. Dawson
Assistant Examiner—David Reifsnyder
Attorney, Agent, or Firm—Wenderoth, Lind & Ponack

[57] ABSTRACT

In a continuous process for drying a sludge composed of combustible material and water, the wet sludge is first mixed with a proportion of material which has been dried in the process and is then fed into a hot gas stream from a burner. The hot gas stream carries the mixture along and dries it, and a proportion is tapped off and mixed with the incoming wet sludge. A part of the remainder is fed, with supplementary fuel, if necessary, to the burner to create the hot gas stream. The rate of fuel supply is varied in dependence on a temperature of the hot gas stream when it exhausts from the mixture drying operation.

5 Claims, 1 Drawing Sheet

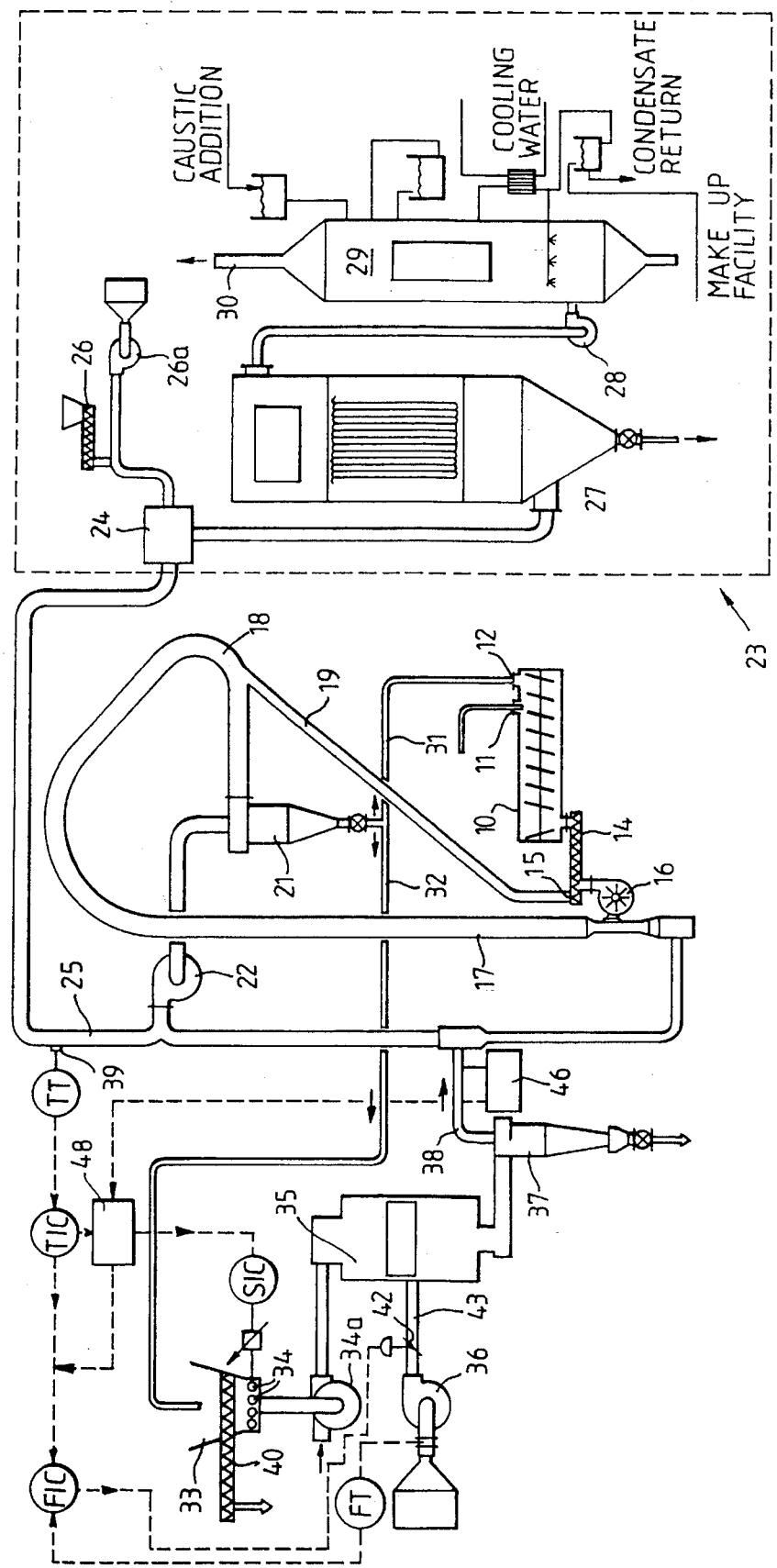

SLUDGE TREATING PROCESS AND APPARATUS

BACKGROUND OF THE INVENTION

This invention relates to processes and apparatus for use in reducing sludges composed of combustible material and water, such as papermaking and sewage sludges. Such sludges are currently often disposed of as land-fill or by dumping out to sea, but both of these methods of disposal are open to environmental objections and there is an urgent need for methods of treatment for disposal which are less detrimental to the environment.

SUMMARY OF THE INVENTION

According to the present invention there is provided a process of reducing a sludge composed of combustible material and water comprising, as a continuous process, the steps of mixing with wet sludge material sludge material which has been dried in the process, and feeding the mixture into a hot gas stream from a burner which gas stream dries the mixture, using a first part of the dried material to mix with the wet sludge to form said mixture, conveying another part of the dried material and, if necessary, supplementary fuel to a combustor of the burner at a rate which varies in dependence on a temperature of the exhaust gas stream from the mixture-drying operation to maintain said temperature constant at a predetermined value.

The process may include the further step of cleansing the gases produced in the drying of the mixture in the hot gas stream to destroy any toxic, noxious or odorous components of the gases.

The invention also provides apparatus for reducing a sludge composed of water and a combustible substance, comprising mixing wet sludge material means for mixing with sludge material which has been dried in the apparatus, means for drying the mixture which means includes a burner producing, at least partly by combustion of dried material from the drying means, a hot gas stream by which the mixture is dried, means for conveying a part of the dried material to the mixing means for mixing with the wet sludge, variable speed means for conveying dried material from the drying means to a combustor of the burner to fuel the burner, means responsive to a temperature of the stream exhausting from the drying means and adapted to control the speed of the conveyor to deliver dried material to the combustor of the burner at a rate to maintain said temperature constant at a predetermined value.

BRIEF DESCRIPTION OF THE DRAWINGS

The figure is a schematic diagram of an apparatus for treating sludge according to the present invention.

DETAILED DESCRIPTION OF THE PREFERRED EMBODIMENT

The invention will now be described in more detail with reference by way of example to the accompanying diagrammatic drawing. The apparatus is designed to dry, for example, paper sludge, which is a waste product in the manufacture of paper and is a mixture of water and a residue which is combustible when dry. The sludge is fed into a mixer 10 through an inlet 11 to be mixed with dried material entering the mixer through an inlet 12. The mixture is thus drier than the sludge and is discharged from the mixer into a feed-screw 14 where the mixture is further dried by the addition of a component of partly dried material entering the feed-screw housing through an inlet 15. The mixture and the component of partly dried material are fed by the feed-screw 14 into a disintegrator 16 which shreds the resulting mixture and discharges it into a current of hot gas flowing upward along a ring duct 17. The mixture is dried by the hot gas as it flows along the ring duct. On the outside of a bend 18 approaching the end of the ring duct is a by-pass duct 19 through which a less dry fraction of the material is fed to the inlet 15 of the feed-screw housing, this fraction being heavier than the bulk of the material and consequently tending to be concentrated on the outside of the bend. The remaining, drier, material is carried along the ring duct to a cyclone 21 through which the dried material falls while a proportion of the damp gases which have acted as a carrier for the mixture are drawn upward out of the cyclone by a main fan 22 and directed along a duct 25 to a cleaning section.

In the cleaning section, the damp gases are mixed in a mixing chamber 24 with active carbon on an air-current from a screw-type dosing apparatus 26 and a co-operating air fan 26a. The mixture is passed from chamber 24 to a first cleaning apparatus 27 for treatment by the carbon, then assisted by a fan 28 to a scrubber 29 for further cleaning with caustic soda, and finally to atmosphere through an exhaust duct 30.

The dried material leaving the cyclone 21 is divided into two parts, a minor part being driven along a duct 31 by a feed-screw (not shown) to the inlet of the mixer 10 for mixture with the sludge as previously mentioned, and the major part being driven along a duct 32 by a further feed-screw (not shown) to a hopper 33. From the hopper 33, which forms a reservoir for the dried material. The material is fed by motor-driven feed-screws 34 and on a small air-current driven by a fan 34a to a vortex combustor 35 into which the main air supply for combustion is blown by a fan 36. The dried material forms the fuel burnt in the combustor and the hot gases of combustion and the ash from the fuel are blown into an ash cyclone 37, which separates the ash and enables it to be discharged. The hot gases are fed from the ash cyclone 37 into a duct 38 to join a downwardly-flowing fraction of damp air and gases tapped from the duct 25 downstream of the main fan 22 carrying the exhaust gases from cyclone 21 to the cleaning section 23, and is directed to the lower end of the vertical duct 17 into which the wet material from the mixer is passed. The damp-air fraction serves to reduce the temperature of the hot Gas flow from the combustor somewhat.

The speed of the motor driving the feed-screws 34 and, in consequence, the amount of dried material fed to the combustor 35 is controlled automatically by a sensor indicated at 39 disposed so as to be responsive to the temperature of the exhaust gas stream passing through the fan 22 in the outlet of the cyclone 21. This temperature is inversely related to the moisture content of the material dried in the apparatus. If this temperature drops below a predetermined value the sensor 39 actuates an increase in the speed of the feed-screws 34 and if the temperature rises above a predetermined value, the sensor actuates a reduction in the speed of the feed-screws.

A feed-screw 40 is disposed in the upper part of the hopper 33, so that if the level of dried material in the hopper rises to the feed-screw, indicating that the amount of dried material exceeds the requirements of the dryer circuit, the surplus above the said level is removed from the hopper for use elsewhere.

The combustor 35 incorporates a gas or oil fuel supply system for use in starting the operation of the apparatus to heat the combustor to a temperature at which the combustion process is self-sustaining, and for use in the event that the amount or calorific value of the dried material is temporarily or permanently too low to meet the needs of the process.

More specifically, in operation of the apparatus, the optimum exhaust temperature to achieve drying of the product is obtained by testing, and the control system is then set accordingly to maintain the temperature at that optimum value. The temperature detected by sensor 39 is passed by a temperature transmitter TT to a temperature indicator control TIC. If the detected temperature falls below the predetermined optimum then control TIC actuates, through a trim algorithm, an increase in the speed of the screw conveyors 34 in the base of the hopper 33 to increase the supply of dried material to the combustor 35 and thus to increase the temperature of the hot gases fed to the ring duct 17. At the same time, control TIC actuates an air flow control FIC to operate a valve 42 in the combustion air duct 43 so as to increase the amount of air supplied to the combustor, but to an extent which is regulated by a flow sensor FT responsive to the flow of the air drawn in by fan 36, and by an oxygen-content analyzer 46 operating on the hot gases discharged from the combustor and ensuring that the increased air supply does not result in over-rich or over-lean oxygenscontent in the hot gases. Conversely, if the temperature detected by sensor 39 rises above the predetermined temperature, the control system operates to reduce the flow of dried material and air to the combustor.

If the temperature detected by sensor 39 remains consistently below the predetermined value, then temperature indicator control TIC actuates the supply of supplementary fuel into the combustion chamber of the combustor to bring the temperature up to the predetermined value. Some fuels have a high calorific value in which case no support fuel is required, some are marginal where the support fuel needs to be switched in and out and some have low calorific value and always require support fuel up to perhaps 10% of the total.

The dryer shown and described is of the kind known as a ring dryer, but other forms of dryer such as a pneumatic conveying dryer or a rotary dryer may be used.

Excess dried material produced in the process may be pelletized or otherwise agglomerated into a non-dusty easily transportable form. Excess dried material may also be pasteurized by retaining it at a temperature of over 100° C. for a period sufficient to ensure that no bacterial activity remains in the material.

The ash separated in the ash cyclone may be vitrified to fix it and to render it easier to dispose of without the risk of leaching out of some of the components of the ash.

I claim:

1. A continuous process of reducing a wet sludge, said process comprising forming a mixture of the wet sludge and a dried mixing material; feeding the mixture into a hot gas stream issuing from a combustor which gas stream dries the mixture to produce dried material and an exhaust gas stream; conveying a first part of the dried material to be mixed with the wet sludge, the first part of the dried material being the dried mixing material; conveying a second part of the dried material to the combustor at a rate which varies in dependence on a temperature of the exhaust gas stream and combusting said second part of the dried material in the combustor to maintain said temperature constant at a predetermined value.

2. A process as claimed in claim 1, and further comprising treating the exhaust gas stream to destroy toxic, noxious or odorous components of the exhaust gas stream.

3. A process as claimed in claim 1, wherein a proportion of the exhaust gas stream is added to the hot gas stream from the combustor prior to said feeding of the mixture into the hot gas stream.

4. A process as claimed in claim 1, and further comprising supplying fuel with the second part of the dried material to the combustor.

5. A process as claimed in claim 4, wherein the fuel is supplied to the combustor in an amount necessary to effect combustion of said second part of the dried material.

\* \* \* \* \*